(12) United States Patent
Zhang et al.

(10) Patent No.: US 11,563,674 B2
(45) Date of Patent: Jan. 24, 2023

(54) CONTENT BASED ROUTING METHOD AND APPARATUS

(71) Applicant: Beijing Baidu Netcom Science and Technology Co., Ltd., Beijing (CN)

(72) Inventors: Miao Zhang, Beijing (CN); Sijie Yang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/698,779

(22) Filed: Nov. 27, 2019

(65) Prior Publication Data

US 2020/0412644 A1 Dec. 31, 2020

(30) Foreign Application Priority Data

Jun. 28, 2019 (CN) .......................... 201910577329.7

(51) Int. Cl.
*H04L 45/302* (2022.01)
*H04L 45/12* (2022.01)
*H04L 67/63* (2022.01)
*H04L 45/00* (2022.01)
*H04L 67/568* (2022.01)
*H04L 67/02* (2022.01)
*H04L 69/22* (2022.01)
*H04L 45/30* (2022.01)

(52) U.S. Cl.
CPC .......... *H04L 45/306* (2013.01); *H04L 45/123* (2013.01); *H04L 45/124* (2013.01); *H04L 67/63* (2022.05)

(58) Field of Classification Search
CPC ... H04L 45/306; H04L 45/123; H04L 67/327; H04L 45/124; H04L 45/38; H04L 67/02; H04L 69/22; H04L 67/2842; H04L 45/30
See application file for complete search history.

(56) References Cited

U.S. PATENT DOCUMENTS

| | | | | |
|---|---|---|---|---|
| 7,587,487 B1* | 9/2009 | Gunturu | .............. | G06F 16/2448 709/227 |
| 9,811,248 B1* | 11/2017 | Berg | ..................... | G06F 3/0481 |
| 10,554,741 B1* | 2/2020 | Krueger | .............. | H04L 67/1004 |
| 2002/0194317 A1* | 12/2002 | Kanada | ................... | H04L 47/10 709/223 |

(Continued)

OTHER PUBLICATIONS

Title: "Content Based Routing" Publisher: JBoss Inc URL: https://docs.jboss.org/jbossesb/docs/4.2.1GA/manuals/html/services/ContentBasedRouting.html (Year: 2007).*

(Continued)

*Primary Examiner* — John A Follansbee
*Assistant Examiner* — Kamal M Hossain
(74) *Attorney, Agent, or Firm* — Kilpatrick Townsend & Stockton LLP

(57) ABSTRACT

Embodiments of the present disclosure provide a content based routing method and apparatus. The method may include: judging, in response to receiving a service request, whether the service request matches a preset shunt rule, the preset shunt rule including a request content and a request context; and forwarding, in response to judging that the service request matches the preset shunt rule, the service request to a service cluster corresponding to the preset shunt rule matching the preset service request.

16 Claims, 3 Drawing Sheets

200 in response to receiving a service request, judge whether the service request matches a preset shunt rule, the preset shunt rule including a request content and a request context — 201 in response to judging that the service request matches the preset shunt rule, forward the service request to a service cluster corresponding to the preset shunt rule matching the preset service request — 202

(56) References Cited

U.S. PATENT DOCUMENTS

| | | | | |
|---|---|---|---|---|
| 2005/0108021 | A1* | 5/2005 | Anderson | H04L 41/5054 709/205 |
| 2006/0112174 | A1* | 5/2006 | L'Heureux | H04L 67/565 709/225 |
| 2006/0143703 | A1* | 6/2006 | Hopen | G06F 21/6218 726/15 |
| 2007/0206584 | A1* | 9/2007 | Fulling | H04L 67/63 370/356 |
| 2013/0259052 | A1* | 10/2013 | Akiyosh | H04L 45/38 370/392 |
| 2014/0108496 | A1* | 4/2014 | Heller | G06F 16/951 709/203 |
| 2014/0181256 | A1* | 6/2014 | Trifa | H04L 67/54 709/218 |
| 2015/0365334 | A1* | 12/2015 | Wang | H04L 67/01 709/203 |
| 2015/0373013 | A1* | 12/2015 | Gupta | H04L 63/0823 726/10 |
| 2016/0285992 | A1* | 9/2016 | Katsev | H04L 67/22 |
| 2019/0319885 | A1* | 10/2019 | Fan | H04L 45/306 |
| 2020/0028968 | A1* | 1/2020 | Mendiratta | H04M 3/5238 |

OTHER PUBLICATIONS

Title: "New—Advanced Request Routing for AWS Application Load Balancers" Author: Jeff Barr URL: https://aws.amazon.com/blogs/aws/new-advanced-request-routing-for-aws-application-load-balancers/ (Year: 2019).*

* cited by examiner

CONTENT BASED ROUTING METHOD AND APPARATUS

CROSS-REFERENCE TO RELATED APPLICATIONS

This application claims priority to Chinese Patent Application No. 201910577329.7, filed with the China National Intellectual Property Administration (CNIPA) on Jun. 28, 2019, the contents of which are incorporated herein by reference in their entirety.

TECHNICAL FIELD

Embodiments of the present disclosure relate to the field of computer technology, and specifically to a content based routing method and apparatus.

BACKGROUND

HTTP is the most widely used protocol for Internet applications. In order to flexibly manage HTTP traffic forwarding, many Internet companies choose to deploy load balancing services at the network portal, and flexibly control the forwarding of requests to appropriate downstream service clusters by configuring shunt rules. This technique of forwarding traffic based on request content is generally called "Content Based Routing" (CBR).

Conventional shunt rules have the following defects: fewer condition types; simple logical combination, and failing to support AND, OR, NOT based logical groups and nested use; failing to reuse conditions, repeated configuration of some common conditions is requested, and maintenance cost is high when modification is required.

SUMMARY

Embodiments of the present disclosure provides a content based routing method and apparatus.

According to a first aspect, some embodiments of the present disclosure provides a content based routing method, including: judging, in response to receiving a service request, whether the service request matches a preset shunt rule, the preset shunt rule comprising a request content and a request context; and forwarding, in response to judging that the service request matches the preset shunt rule, the service request to a service cluster corresponding to the preset shunt rule matching the preset service request.

In some embodiments, in response to judging that the service request does not match the preset shunt rule, setting a shunt rule matching the service request and storing the shunt rule.

In some embodiments, the judging, in response to receiving a service request, whether the service request matches a preset shunt rule includes: judging, in response to receiving the service request, whether the service request matches a preset content in the preset shunt rule; and judging, in response to judging that the service request matches the preset content in the preset shunt rule, that the service request matches the preset shunt rule.

In some embodiments, the preset shunt rule includes logical combinations between request contents, between request contexts, and between a request content and a request context.

In some embodiments, the preset shunt rule includes a condition variable, and the condition variable includes any one of: a request content; a request context; a logical combination between request contents; a logical combination between request contexts; and a logical combination between a request content and a request context.

In some embodiments, the preset shunt rule includes at least one of a logical combination between the condition variable and the request content or a logical combination between the condition variable and the request context.

In some embodiments, the request content includes: a request host name, a request path, a request query, a request header field, a request browser cache, a request user agent, a request uniform resource locator, and a request method.

In some embodiments, the request context includes at least one of the following of the service request: a request protocol, a request address, a request tag, a request time, or a request cluster.

According to a second aspect of present disclosure, some embodiments of present disclosure provide a content based routing apparatus, including: a request protocol, a request address, a request tag, a request time, or a request cluster; and a service request forwarding unit, configured to forward, in response to judging that the service request matches the preset shunt rule, the service request to a service cluster corresponding to the preset shunt rule matching the preset service request.

In some embodiments, the apparatus further includes: a shunt rule setting unit, configured to set, in response to judging that the service request does not match the preset shunt rule, a shunt rule matching the service request, and store the shunt rule.

In some embodiments, the shunt rule matching unit is configured to judge, in response to receiving the service request, whether the service request matches a preset content in the preset shunt rule; and judge, in response to judging that the service request matches the preset content in the preset shunt rule, that the service request matches the preset shunt rule.

In some embodiments, the preset shunt rule includes logical combinations between request contents, between request contexts, and between a request content and a request context.

In some embodiments, the preset shunt rule includes a condition variable, and the condition variable includes any one of: a request content; a request context; a logical combination between request contents; a logical combination between request contexts; and a logical combination between a request content and a request context.

In some embodiments, the preset shunt rule includes at least one of a logical combination between the condition variable and the request content or a logical combination between the condition variable and the request context.

In some embodiments, the request content includes: a request host name, a request path, a request query, a request header field, a request browser cache, a request user agent, a request uniform resource locator, and a request method.

In some embodiments, the request context includes at least one of the following of the service request: a request protocol, a request address, a request tag, a request time, or a request cluster.

According to a third aspect, some embodiments of present disclosure provide a computer-readable medium, the computer-readable medium stores a computer program thereon, where the program, when executed by a processor, causes the processor to implement the method according to any one of the implementations of the first aspect.

According to a fourth aspect, some embodiments of present disclosure provide an electronic device, the electronic device includes: one or more processors; and a storage apparatus, storing one or more programs, where the one or more programs, when executed by the one or more processors, cause the one or more processors to implement the method according to any one of the implementations of the first aspect.

The content based routing method and apparatus provided in some embodiments of the present disclosure judges, in response to receiving a service request, whether the service request matches a preset shunt rule, the preset shunt rule comprising a request content and a request context, and forwards, in response to judging that the service request matches the preset shunt rule, the service request to a service cluster corresponding to the preset shunt rule matching the preset service request. The preset shunt rule supports a rich type of request content and request context, and supports that the request content and the request context nested use the combinations of AND, OR, NOT logical operation symbols, can flexibly customize a shunt forwarding policy; supports defining and nested reference of a condition variable, the condition variable may be nested and reused, which solves the problems of repeated configuration of common conditions and high updating cost in the prior art.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

In a typical configuration of the present disclosure, a request terminal issuing a service request and a server each includes one or more central processing units (CPUs), an input/output interface, a network interface, and a memory. The memory may include the forms of a volatile memory, a random access memory (RAM) and/or a non-volatile memory in the computer-readable medium, such as a read-only memory (ROM) or a flash memory (flash RAM). The memory is an example of the computer-readable medium.

The computer-readable medium includes permanent and non-permanent, mobile and immobile media, and may store information by any method or technology. The information may refer to computer-readable instructions, data structures, modules of programs or other data. The examples of storage media of a computer include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technology, a compact disk read only Memory (CD-ROM), a digital versatile disc (DVD) or other optical storage, a magnetic cartridge tape, a tape disk storage or other magnetic storage device or any other non-transportable media, which can be used for storing information that can be accessed by a computing device. As defined herein, the computer-readable medium does not include non-transitory computer-readable media, such as modulated data signals and carriers.

Figure 1:
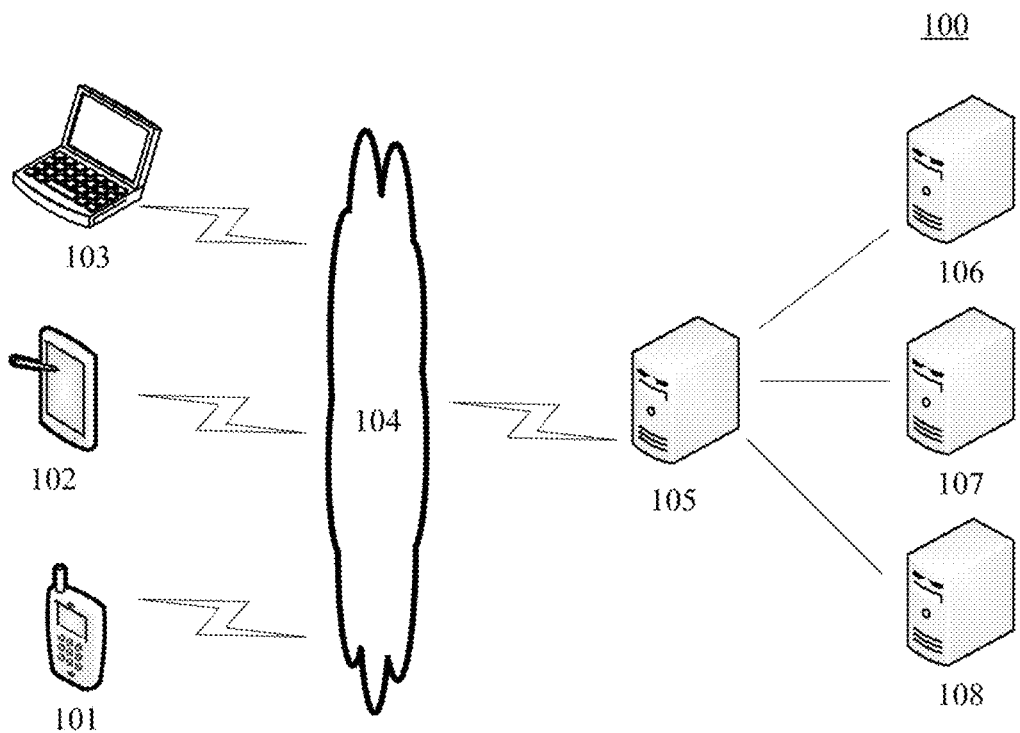
FIG. 1 is an architectural diagram of an example system to which an embodiment of the present disclosure may be applied.

FIG. 1 shows an example architecture 100 to which a content based routing method or apparatus according to some embodiments of the present disclosure may be applied.

As shown in FIG. 1, the system architecture 100 may include a terminal device 101, 102 or 103, a network 104, a load balancing device 105, and a server 106, 107 or 108. The network 104 serves as a medium providing a communication link between the terminal device 101, 102 or 103 and the load balancing device 105. The network 104 may include various types of connections, such as wired or wireless communication links, or optical fiber cables.

A user may perform data interaction with the load balancing device 105 via the network 104 by using the terminal device 101, 102 or 103. The terminal device 101, 102 or 103 may be installed with various data interaction applications, such as web engine applications, data processing applications, or instant messaging applications.

The terminal device 101, 102 or 103 may be hardware or software. When the terminal device 101, 102 or 103 is hardware, the terminal device may be various electronic devices having the data interaction function, including but not limited to a smart phone, a tablet computer, an e-book reader, a laptop computer, a desktop computer, etc. When the terminal device 101, 102 or 103 is software, the terminal device may be installed in the above-listed electronic devices. The terminal device may be implemented as a plurality of software programs or software modules for data interaction services, or as a single software program or software module. Specific limitations are not provided herein.

The load balancing device 105 may be hardware or software. When the load balancing device 105 is hardware, the load balancing device 105 may be various electronic devices that provide the load balancing function for the server, such as a load balancing server. When the load balancing device 105 is software, the load balancing device 105 may be installed in the above electronic devices.

It should be noted that the content based routing method according to some embodiments of the present disclosure may be performed by the terminal device 101, 102 or 103, or by the load balancing device 105. Accordingly, the apparatus for detecting a normal user of a client may be provided in the terminal device 101, 102 or 103, or in the load balancing device 105. Specific limitations are not provided herein.

The server 106, 107 or 108 may be a server providing various services, such as a backend web server providing support for web pages displayed on the terminal device 101, 102 or 103, or an FTP server supporting movement of files through file transfer protocol tools, etc.

It should be noted that the server 106, 107 or 108 may be hardware or software. When the server is hardware, the server may be implemented as a distributed server cluster composed of multiple servers, or implemented as a single server. When the server is software, the server may be implemented as a plurality of software programs or software modules for providing distributed services, or as a single software program or software module. Specific limitations are not provided herein.

It should be understood that the numbers of the terminal device, the load balancing device, and the servers in FIG. 1 are merely illustrative. Any number of terminal device, load balancing device and server may be provided based on actual requirements.

Figure 2:
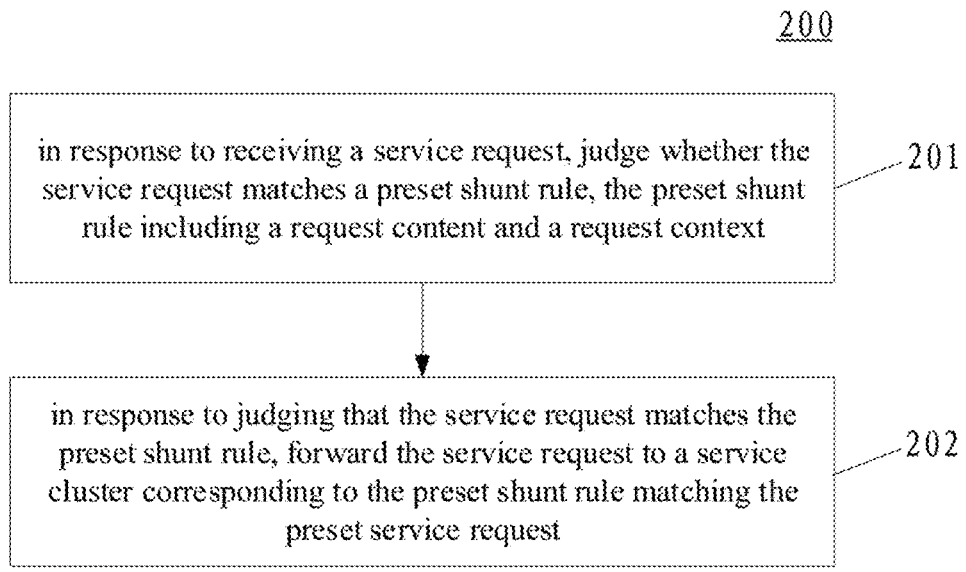
FIG. 2 is a flowchart of a content based routing method according to an embodiment of the present disclosure.

Further referring to FIG. 2, a flow 200 of a content based routing method according to an embodiment of the present disclosure is shown, the method includes:

Step 201: judging, in response to receiving a service request, whether the service request matches a preset shunt rule, the preset shunt rule including a request content and a request context.

In the present embodiment, the executing body (for example, the load balancing device 105 in FIG. 1) of the present embodiment may receive various service requests, such as a page request, a data browsing request and the like sent by a user through a terminal device, which is not limited in the present embodiment. In response to receiving the service request, whether the service request matches the preset shunt rule is judged. The preset shunt rule is set by a relevant operator, and includes a request content and a request context.

In some alternative implementations of the present embodiment, the request content includes: a request host name, a request path, a request query, a request header field, a request cookie, a request user agent, a request uniform resource locator, and a request method. The request context includes at least one of the following of the service request: a request protocol, a request address, a request tag, a request time, or a request cluster. The service request sent by the user through the terminal device may include one or more of the above request contents and the request contexts. The executing body (for example, the load balancing device 105 in FIG. 1) of the present embodiment judges, in response to receiving the service request, whether the service request matches a preset content in the preset shunt rule, and judges, in response to judging that the service request matches the preset content in the preset shunt rule, that the service request matches the preset shunt rule.

In the present embodiment, the request host name refers to the name of a computer that issues the service request, and a host in the network is identified by the host name. The request path includes a requested resource path and a resource name. An absolute path and a relative path are provided, a resource cannot be uniquely located merely based on the relative path. The relative path refers to a path which, when combined with a reference path, may be converted into an absolute path capable of locating a resource. The absolute path refers to a path that can uniquely locate a resource. The request header field refers to a request header in a request protocol. The request query refers to a request parameter in the request protocol. The request browser cache refers to a request Cookie, and the Cookie is a way in which the server or script may maintain the information on a client workstation under the HTTP. Cookie is small text files that are saved by a Web server on a user's browser (client), and may contain information about the user. Whenever the user links to the server, the Web can access the Cookie information. The request user agent refers to a User Agent, and the User Agent is a special string header, and enables the server to identify the operating system and version thereof, CPU type, browser and version thereof, browser rendering engine, browser language, browser plug-in, and the like used by the client. The uniform resource locator is a compact representation of the location and access method of a resource available on the Internet, and is the address of the standard resource on the Internet. Each file on the Internet has a unique uniform resource locator.

The request protocol includes an HTTP (HyperText Transfer Protocol) or an HTTPS (Hypertext Transfer Protocol Secure). The HTTP is a transfer protocol for transferring a hypertext from a WWW server to a local browser. The HTTP can make the browser more efficient and reduce network transmissions. The HTTP not only ensures that the computer transfers hypertext documents correctly and quickly, but also determines which part of the document is to be transferred and which part of the content is displayed first (for example, texts prior to graphs). The HTTPS is a HTTP channel targeting at security, which is simply a security version of HTTP.

The request address is an IP address (Internet Protocol Address) corresponding to the service request. The request time refers to the time at which the service request occurs. The request cluster refers to a destination service cluster for the service request.

In some alternative implementations of the present embodiment, the preset shunt rule includes logical combinations between request contents, between request contexts, and between a request content and a request context.

In some alternative implementations of the present embodiment, the preset shunt rule further includes a condition variable. The condition variable may be assigned a request content, or a request context, or a logical combination between request contents, or a logical combination between request contexts, or a logical combination between a request content and a request context. The condition variable may be iteratively used in the preset shunt rule, that is, the preset shunt rule includes a logical combination between the condition variable and the request content or a logical combination between the condition variable and the request context. The logical combination includes logical AND, logical OR, and/or logical NOT.

Step 202: forwarding, in response to judging that the service request matches the preset shunt rule, the service request to a service cluster corresponding to the preset shunt rule matching the preset service request.

In the present embodiment, because the current Internet services are increasingly complicated, when corresponding services are processed, different types of service traffic are often processed through different service clusters, for example, a browsing request, a picture request, a payment request, and the like are respectively processed through different service clusters. Moreover, multiple service clusters may be distributed in different regions and serve users in the different regions. The executing body (for example, the load balancing device 105 in FIG. 1) of the present embodiment forwards, in response to a corresponding preset shunt rule being matched in the preset shunt rules, the service request to the service cluster corresponding to the preset shunt rule that matches the preset service request, thereby flexibly meeting the traffic forwarding requirements in the complicated service cases, and providing services to user groups, to prevent all service clusters from storing the same total amount of user data. The service cluster refers to concentrating a plurality of servers for performing an identical service. From the perspective of the client, the service cluster is like only one server. The cluster may use a plurality of computers for parallel computing, to achieve a high computing speed, and may also be backed up by a plurality of computers, so that the overall system can still operate normally when any a machine is broken.

In the present embodiment, the preset shunt rule supports a rich type of request content and request context, and supports that the request content and the request context nested use the combinations of AND, OR, NOT logical operation symbols, can flexibly customize a shunt forwarding policy; supports defining and nested reference of a condition variable, the condition variable may be nested and reused, which solves the problems of repeated configuration of common conditions and high updating cost in the prior art.

Figure 3:
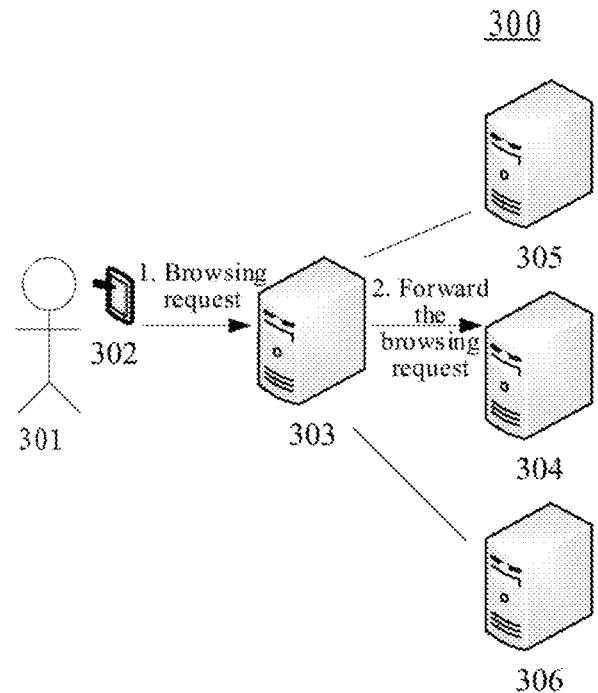
FIG. 3 is a schematic diagram of an application scenario of the content based routing method according to an embodiment of the present disclosure.

Further referring to FIG. 3, an application scenario of the content based routing method is schematically illustrated. A user 301 issues a browsing request for a web page through a smart phone 302, and a load balancing server 303 receives the browsing request and matches the browsing request with the stored preset shunt rule. Through the matching process, it is judged that the browsing request matches the preset shunt rule, the preset shunt rule includes determining a request domain name and determining a time at which the browsing request occurs. The load balancing server 303 forwards, in response to the browsing request matching the preset shunt rule, the browsing request to a service cluster 304 corresponding to the preset shunt rule. The service cluster 304 sends, in response to the browsing request, web page information corresponding to the browsing request to the smart phone 302. The preset shunt rules corresponding to the service clusters 305 and 306 do not match the browsing request, and thus the browsing request is not received by the clusters 305 and 306.

Figure 4:
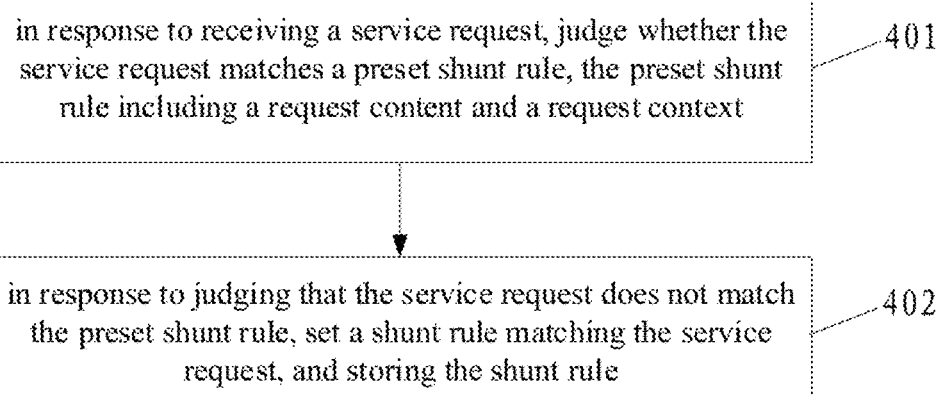
FIG. 4 is a flowchart of the content based routing method according to another embodiment of the present disclosure.

Further referring to FIG. 4, a flow 400 of the content based routing method according to another embodiment of the present disclosure is shown, the method includes:

Step 401: judging, in response to receiving a service request, whether the service request matches a preset shunt rule, the preset shunt rule including a request content and a request context.

In the present embodiment, step 401 is performed similar to step 201, and details are not described herein again.

Step 402: in response to judging that the service request does not match the preset shunt rule, setting a shunt rule matching the service request, and storing the shunt rule.

In the present embodiment, the case of that the service request may not match the preset shunt rule may arise. In this case, the relevant operator needs to set a corresponding shunt rule according to the service request, to obtain a more comprehensive preset shunt rule, so as to satisfy various service requests. The set shunt rule may be stored in the executing body (for example, the load balancing device 105 in FIG. 1) of the present embodiment for use in the matching process when a service request is received next time, where the matching process refers to match the service request with the preset shunt rule.

As can be seen from FIG. 4, compared with the embodiment corresponding to FIG. 2, the flow 400 of the content based routing method in the present embodiment specifies supplementary setting of the shunt rule when the service request does not match the preset shunt rule. In this way, a more comprehensive preset shunt rule can be obtained to satisfy various service requests.

Figure 5:
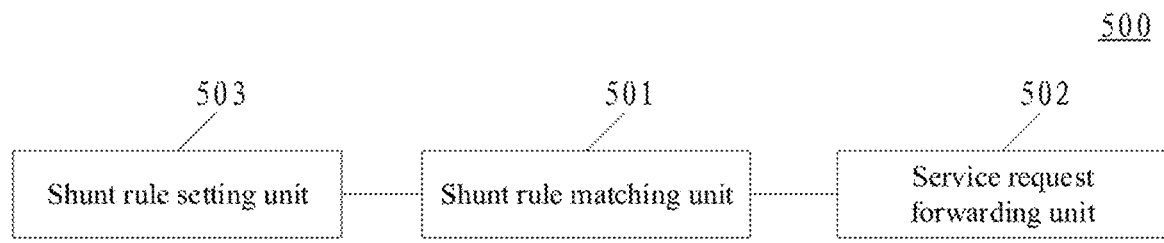
FIG. 5 is a structural diagram of a content based routing apparatus according to an embodiment of the present disclosure.

With further reference to FIG. 5, as an implementation of the method shown in the above figures, some embodiments of the present disclosure provide a content based routing apparatus. The embodiment of the apparatus corresponds to the embodiment of the method shown in FIG. 2, and the batch updating apparatus may be applied to various electronic devices.

As shown in FIG. 5, the batch updating apparatus 500 of the present embodiment includes a shunt rule matching unit 501, a service request forwarding unit 502, and a shunt rule setting unit 503.

The shunt rule matching unit 501 is configured to judge, in response to receiving a service request, whether the service request matches a preset shunt rule, the preset shunt rule including a request content and a request context. The service request forwarding unit 502 is configured to forward, in response to judging that the service request matches the preset shunt rule, the service request to a service cluster corresponding to the preset shunt rule matching the preset service request. The shunt rule setting unit 503 is configured to set, in response to judging that the service request does not match the preset shunt rule, a shunt rule matching the service request, and store the shunt rule.

In some alternative implementations of the present embodiment, the request content includes: a request host name, a request path, a request query, a request header field, a request browser cache, a request user agent, a request uniform resource locator, and a request method. The request context includes at least one of the following of the service request: a request protocol, a request address, a request tag, a request time, or a request cluster.

In some alternative implementations of the present embodiment, the preset shunt rule includes logical combinations between request contents, between request contexts, and between a request content and a request context.

In some alternative implementations of the present embodiment, the preset shunt rule includes a condition variable. The condition variable may be assigned a request content, or a request context, or a logical combination between request contents, or a logical combination between request contexts, or a logical combination between a request content and a request context. The condition variable may be iteratively used in the preset shunt rule, that is, the preset shunt rule includes a logical combination between the condition variable and the request content, or a logical combination between the condition variable and a request context. The logical combination includes logical AND, logical OR, and/or logical NOT.

Hereinafter, referring to FIG. 6, a schematic structural diagram of a computer system 600 of a device (for example, the terminal device 101, 102 or 103 and the load balancing device 105 shown in FIG. 1) adapted to implement some embodiments of the present disclosure is shown. The device shown in FIG. 6 is merely an example, and should not limit the function and scope of use of the embodiments of the present disclosure.

Figure 6:
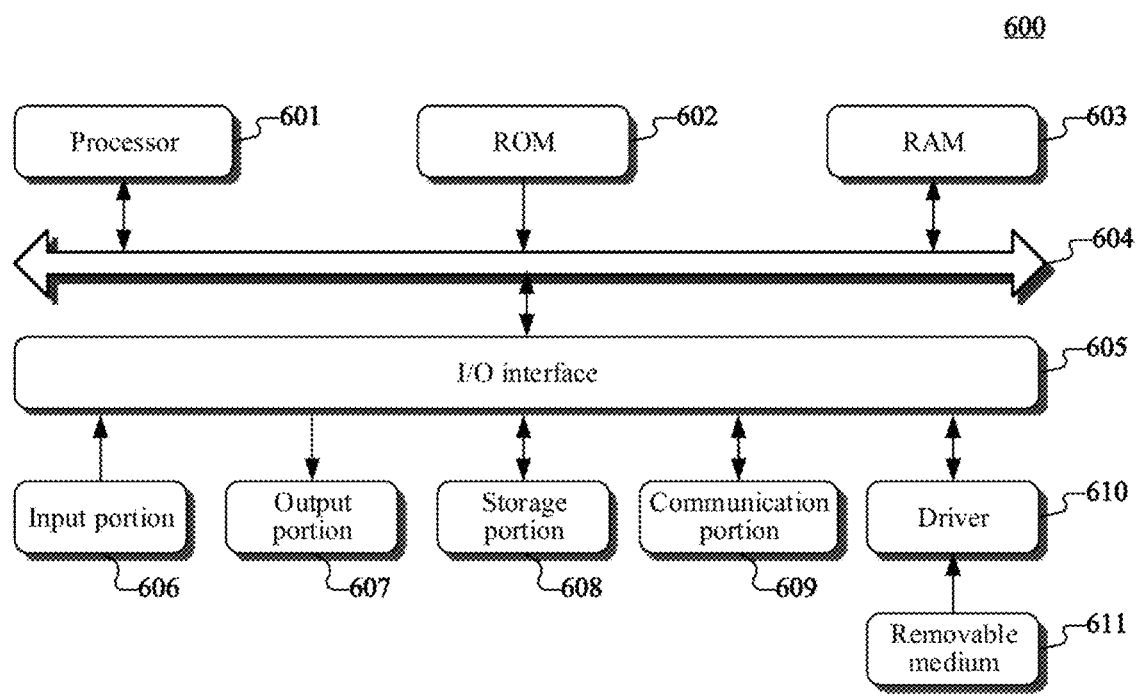
FIG. 6 is a schematic structural diagram of a computer system adapted to implement some embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610 as required, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is hosted in a machine-readable medium. The computer program includes program codes for executing the method as illustrated in the flow chart. In such an embodiment, the computer program may be downloaded and installed from a network via the communication portion 609, or may be installed from the storgae portion 608, or may be installed from the ROM 602. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a user behavior judging unit and a normal user judging unit. where the names of these units or modules do not in some cases constitute a limitation to such units or modules themselves. For example, the shunt rule matching unit may also be described as "a unit configured to judge, in response to receiving a service request, whether the service request matches a preset shunt rule".

In another aspect, some embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: judge, in response to receiving a service request, whether the service request matches a preset shunt rule, the preset shunt rule including a request content and a request context; and forward, in response to judging that the service request matches the preset shunt rule, the service request to a service cluster corresponding to the preset shunt rule matching the preset service request.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A content based routing method, comprising:
judging by a load balancing device, in response to receiving a service request, whether a user agent, a hypertext transfer protocol (HTTP) or a hypertext transfer protocol secure (HTTPS), a time indicating when the service request occurs, and a uniform resource locator (URL) included in the service request match a preset shunt rule in preset shunt rules, the preset shunt rule comprising a request content of request contents and a request context in request contexts, wherein the request context comprised in the preset shunt rule comprises a request time, and the request time refers to a time when a request occurs, wherein the user agent is a string header that enables a server to identify an operating system and version thereof, a browser and version thereof, and a browser rendering engine; and
forwarding by the load balancing device, in response to judging that the user agent, the HTTP or the HTTPS, the time indicating when the service request occurs, and the URL included in the service request match the preset shunt rule in the preset shunt rules, the service request to a service cluster corresponding to the preset shunt rule matching the service request,
wherein:
the preset shunt rule further comprises a condition variable, the condition variable being assigned with any one of: a logical combination between two request contents in the request contents, a logical combination between two request contexts in the request contexts, or a logical combination between the request content and the request context, to avoid repeated configuration of common conditions;
the preset shunt rule further comprises at least one of (1) a logical combination between the assigned condition variable and any request content in the request contents or (2) a logical combination between the assigned condition variable and any request context in the request contexts, so that the condition variable is reused and nested in the preset shunt rule;
the logical combination includes at least one of: logical AND, logical OR, or logical NOT, and
wherein the request contents comprise: a request user agent, a request URL, a request host name, a request path, a request query, a request header field, and a request Cookie, and wherein the request contexts comprise a request protocol including a request HTTP or a request HTTPS, a request address, a request tag, the request time, and a request server cluster.

2. The method according to claim 1, wherein in response to judging that the user agent, the HTTP or the HTTPS, the time indicating when the service request occurs, and the URL included in the service request do not match the preset shunt rule, setting a shunt rule matching the service request and storing the shunt rule.

3. The method according to claim 1, wherein the judging, in response to receiving the service request, whether the user agent, the hypertext transfer protocol (HTTP) or the hypertext transfer protocol secure (HTTPS), the time indicating when the service request occurs, and the uniform resource locator (URL) included in the service request match the preset shunt rule comprises:
judging, in response to receiving the service request, whether the user agent, the HTTP or the HTTPS, the time indicating when the service request occurs, and the URL included in the service request match preset contents in the preset shunt rule; and
judging, in response to judging that the user agent, the HTTP or the HTTPS, the time indicating when the service request occurs, and the URL included in the service request match the preset contents in the preset shunt rule, that the service request matches the preset shunt rule.

4. The method according to claim 1, wherein
the preset shunt rule further comprises logical combinations between the request contents, between the request contexts, and between the request content and the request context.

5. The method according to claim 1, wherein the condition variable is assigned with a logical combination between the request user agent and the request URL; and
the preset shunt rule further comprises a logical combination between the assigned condition variable and the request user agent, the request URL, or the request host name.

6. The method according to claim 1, wherein the condition variable is assigned with a logical combination between the request Cookie and the request time; and
the preset shunt rule further comprises a logical combination between the assigned condition variable and the request user agent, the request URL, the request protocol including the request HTTP or the request HTTPS, or the request host name.

7. A content based routing apparatus, applied in a load balancing device, the apparatus comprising:
at least one processor; and
a memory storing instructions, the instructions when executed by the at least one processor, cause the at least one processor to perform operations, the operations comprising:
judging, in response to receiving a service request, whether a user agent, a hyper text transfer protocol (HTTP) or a hypertext transfer protocol secure (HTTPS), a time indicating when the service request occurs, and a uniform resource locator (URL), included in the service request match a preset shunt rule in preset shunt rules, each of the preset shunt rules comprising a request content in request contents and a request context in request contexts, wherein the request context comprised in the preset shunt rule comprises a request time, and the request time refers to a time when a request occurs, wherein the user agent is a string header that enables a server to identify an operating system and version thereof, a browser and version thereof, and a browser rendering engine; and forwarding, in response to judging that the user agent, the HTTP or the HTTPS, the time indicating when the service request occurs, and the URL included in the service request match the preset shunt rule in the preset shunt rules, the service request to a service cluster corresponding to the preset shunt rule matching the service request, wherein:

the preset shunt rule further comprises a condition variable, the condition variable assigned with any one of: a logical combination between two request contents in the request contents, a logical combination between two request contexts in the request contexts, or a logical combination between the request content and the request context, to avoid repeated configuration of common conditions;

the preset shunt rule further comprises at least one of (1) a logical combination between the assigned condition variable and any request content in the request contents or (2) a logical combination between the assigned condition variable and any request context in the request contexts, so that the condition variable is reused and nested in the preset shunt rule;

the logical combination includes at least one of: logical AND, logical OR, or logical NOT, and wherein the request contents comprise: a request user agent, a request URL, a request host name, a request path, a request query, a request header field, and a request Cookie, and wherein the request contexts comprise a request protocol including a request HTTP or a request HTTPS, a request address, a request tag, the request time, and a request server cluster.

8. The apparatus according to claim 7, wherein the operations further comprise:

setting, in response to judging that the user agent, the HTTP or the HTTPS, the time indicating when the service request occurs, and the URL included in the service request do not match the preset shunt rule, a shunt rule matching the service request, and store the shunt rule.

9. The apparatus according to claim 7, wherein judging whether the user agent, the hyper text transfer protocol (HTTP) or the hypertext transfer protocol secure (HTTPS), the time indicating when the service request occurs, and the uniform resource locator (URL) included in the service request match the preset shunt rule comprises:

judging, in response to receiving the service request, whether the user agent, the HTTP or the HTTPS, the time indicating when the service request occurs, and the URL included in the service request match preset contents in the preset shunt rule; and judging, in response to judging that the user agent, the HTTP or the HTTPS, the time indicating when the service request occurs, and the URL included in the service request match the preset content in the preset shunt rule, that the service request matches the preset shunt rule.

10. The apparatus according to claim 7, wherein the preset shunt rule further comprises logical combinations between the request contents, between the request contexts, and between the request content and the request context.

11. The apparatus according to claim 7, wherein the request contents further comprise: a request method.

12. The apparatus according to claim 7, wherein the request context comprised in the preset shunt rule further comprises:

the request protocol.

13. A non-transitory computer-readable medium, storing a computer program thereon, wherein the computer program, when executed by a processor, causes the processor to implement operations, the operations comprising:

judging by a load balancing device, in response to receiving a service request, whether a user agent, a hyper text transfer protocol (HTTP) or a hypertext transfer protocol secure (HTTPS), a time indicating when the service request occurs, and a uniform resource locator (URL), included in the service request match a preset shunt rule in preset shunt rules, each of the preset shunt rules comprising a request content in request contents and a request context in request contexts, wherein the request context comprised in the preset shunt rule comprises a request time, and the request time refers to a time when a request occurs, wherein the user agent is a string header that enables a server to identify an operating system and version thereof, a browser and version thereof, and a browser rendering engine; and forwarding by the load balancing device, in response to judging that the user agent, the HTTP or the HTTPS, the time indicating when the service request occurs, and the URL included in the service request match the preset shunt rule in the preset shunt rules, the service request to a service cluster corresponding to the preset shunt rule matching the service request, wherein:

the preset shunt rule further comprises a condition variable, the condition variable being assigned with any one of: a logical combination between two request contents in the request contents, a logical combination between two request contexts in the request contexts, or a logical combination between the request content and the request context, to avoid repeated configuration of common conditions;

the preset shunt rule further comprises at least one of (1) a logical combination between the assigned condition variable and any request content in the request contents or (2) a logical combination between the assigned condition variable and any request context in the request contexts, so that the condition variable is reused and nested in the preset shunt rule, the logical combination includes at least one of: logical AND, logical OR, or logical NOT, and wherein the request contents comprise: a request user agent, a request URL, a request host name, a request path, a request query, a request header field, and a request Cookie, and wherein the request contexts comprise a request protocol including a request HTTP or a request HTTPS, a request address, a request tag, the request time, and a request server cluster.

14. The non-transitory computer-readable medium according to claim 13, wherein the operations further comprise:

in response to judging that the user agent, the HTTP or the HTTPS, the time indicating when the service request occurs, and the URL included in the service request do not match the preset shunt rule, setting a shunt rule matching the service request and storing the shunt rule.

15. The non-transitory computer-readable medium according to claim 13, wherein the judging, in response to receiving the service request, whether the user agent, the hyper text transfer protocol (HTTP) or the hypertext transfer protocol secure (HTTPS), the time indicating when the service request occurs, and the uniform resource locator (URL) included in the service request match the preset shunt rule comprises:
- judging, in response to receiving the service request, whether the user agent, the HTTP or the HTTPS, the time indicating when the service request occurs, and the URL included in the service request match preset contents in the preset shunt rule; and
- judging, in response to judging that the service request matches the preset content in the preset shunt rule, that the service request matches the preset shunt rule.

16. The non-transitory computer-readable medium according to claim 13, wherein
- the preset shunt rule further comprises logical combinations between the request contents, between the request contexts, and between the request content and the request context.

* * * * *